United States Patent
Wu et al.

(10) Patent No.: US 7,660,694 B2
(45) Date of Patent: Feb. 9, 2010

(54) ARRANGEMENT FOR DETERMINING AN INITIAL INTERNAL BATTERY TEMPERATURE

(75) Inventors: Zhijian J. Wu, Rochester Hills, MI (US); Michel Trumbo, Troy, MI (US); Yijun Tu, Tecumseh (CA); Min Han, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 182 days.

(21) Appl. No.: 11/531,069

(22) Filed: Sep. 12, 2006

(65) Prior Publication Data
US 2007/0010930 A1    Jan. 11, 2007

Related U.S. Application Data

(63) Continuation-in-part of application No. 11/456,789, filed on Jul. 11, 2006, now abandoned.

(60) Provisional application No. 60/698,235, filed on Jul. 11, 2005.

(51) Int. Cl.
*G06G 7/70* (2006.01)

(52) U.S. Cl. .................. 702/130; 324/431; 320/150; 320/155

(58) Field of Classification Search .............. 702/130; 324/426, 427, 431; 320/112, 132, 150, 155; 374/141
See application file for complete search history.

(56) References Cited

U.S. PATENT DOCUMENTS

| | | | |
|---|---|---|---|
| 6,076,964 A | 6/2000 | Wu et al. | |
| 6,902,319 B2 | 6/2005 | Wu et al. | |
| 2003/0184307 A1 * | 10/2003 | Kozlowski et al. | 324/427 |
| 2005/0074048 A1 | 4/2005 | Wu et al. | 374/4 |

* cited by examiner

*Primary Examiner*—Drew A Dunn
*Assistant Examiner*—Hien X Vo
(74) *Attorney, Agent, or Firm*—Ralph E. Smith (57) ABSTRACT

A method and arrangement is provided for estimating an initial value for an internal battery temperature of a vehicle using a four zone process that determines which of a predetermined set of time zones correlates with a measured period of time for an engine of the vehicle being in an engine-off condition. Once the time zone is determined, an initial estimated value of the internal temperature of the battery is determined as a function of a set of parameters correlated with the determined time zone. The set of time zones include a holding time zone, a model based estimation time zone which is greater in time than the holding time zone, a first self-adjustment zone which is greater in time than the model based estimation time zone, and a second self-adjustment time zone which is greater in time than the first self-adjustment time zone.

13 Claims, 5 Drawing Sheets

ARRANGEMENT FOR DETERMINING AN INITIAL INTERNAL BATTERY TEMPERATURE

RELATED APPLICATION(S)

This application is a continuation-in-part of U.S. patent application Ser. No. 11/456,789, filed Jul. 11, 2006 now abandoned, and which claims the benefit of Provisional Application Ser. No. 60/698,235, filed Jul. 11, 2005, which is incorporated by reference herein

BACKGROUND OF THE INVENTION

1. Field of the Invention

The present invention generally relates to arrangements for estimating the internal temperature of a vehicle battery.

2. Background Art

Generally, the internal temperature of a battery in a motor vehicle is an important variable to be input for engine charging control. The internal temperature is required to determine an accurate set point for an electronic voltage regulator (EVR) in the battery charging system. A proper set point prevents the battery from being overcharged (and overheating) at temperatures higher than a predetermined threshold and undercharged at temperatures lower than a predetermined threshold.

Generally, known vehicle batteries do not, during normal vehicle operation, incorporate internal temperature sensors due to high cost and difficulty in assuring the sensor is replaced when the battery is replaced in service. One solution is to measure internal battery temperature using a sensor mounted to the outside of the battery casing. The drawback of this method is that temperatures measured using the external sensor do not accurately reflect the battery internal temperature, e.g., the error may be as high as 30° C.

To overcome the accuracy problems in measuring the battery internal temperature with an external sensor, calibration algorithms have been used to compensate for deficiencies. To make the calibration effective, however, the calibration algorithms themselves tend to be complicated because of the interactive thermal dynamic process in the battery and the engine block environment, and without accurate calibration, such measurement algorithms may not prove sufficiently adequate.

Still further, irrespective of whether an internal or external battery temperature sensor is used, it is difficult to achieve both high cost effectiveness and acceptable measurement performance in mass vehicle production.

SUMMARY OF THE INVENTION

Therefore, in accordance with one aspect of the present invention, a method is provided for estimating an initial value for an internal temperature of a vehicle battery which includes determining which of a predetermined set of time zones correlates with a measured period of time for an engine of the vehicle being in an engine-off condition, and determining an initial estimated value of the internal temperature of the battery as a function of a set of parameters correlated with the determined time zone.

In accordance with another aspect of the present invention, the time zones are categorized as four different possible time zones including a holding time zone, a model based estimation time zone which is greater in time than the holding time zone, a first self-adjustment zone which is greater in time than the model based estimation time zone, and a second self-adjustment time zone which is greater in time than the first self-adjustment time zone.

In accordance with yet another aspect of the present invention, when in the holding time zone, the initial temperature value is determined as a function of an internal battery temperature predicted at the time the engine is placed in the engine-off condition; when in the model based estimation time zone, the initial temperature value is determined as a function of: battery temperature predicted at engine-off, coolant temperature measured at engine-off, ambient temperature measured at engine-off, coolant temperature measured at engine-on, ambient temperature measured at engine-on, and time elapsed between engine-off and engine on; when in the first self-adjustment time zone, the initial temperature value is determined as a function of ambient temperature measured at engine-on, and charge air temperature measured at engine-on; and when in the second self-adjustment time zone, the initial temperature value is determined as a function of charge air temperature measured at engine-on.

Other aspects of the present invention include a calibration tool for automatic calibration of a battery temperature virtual sensing system (BTVSS) capable of automatically optimizing a set of parameters used in the BTVSS based on provided data, and directly sending the calibration parameters to an engine controller.

The present invention will be more fully understood upon reading the following detailed description of the invention(s) in conjunction with the accompanying drawings.

DETAILED DESCRIPTION OF THE INVENTION

Figure 1:
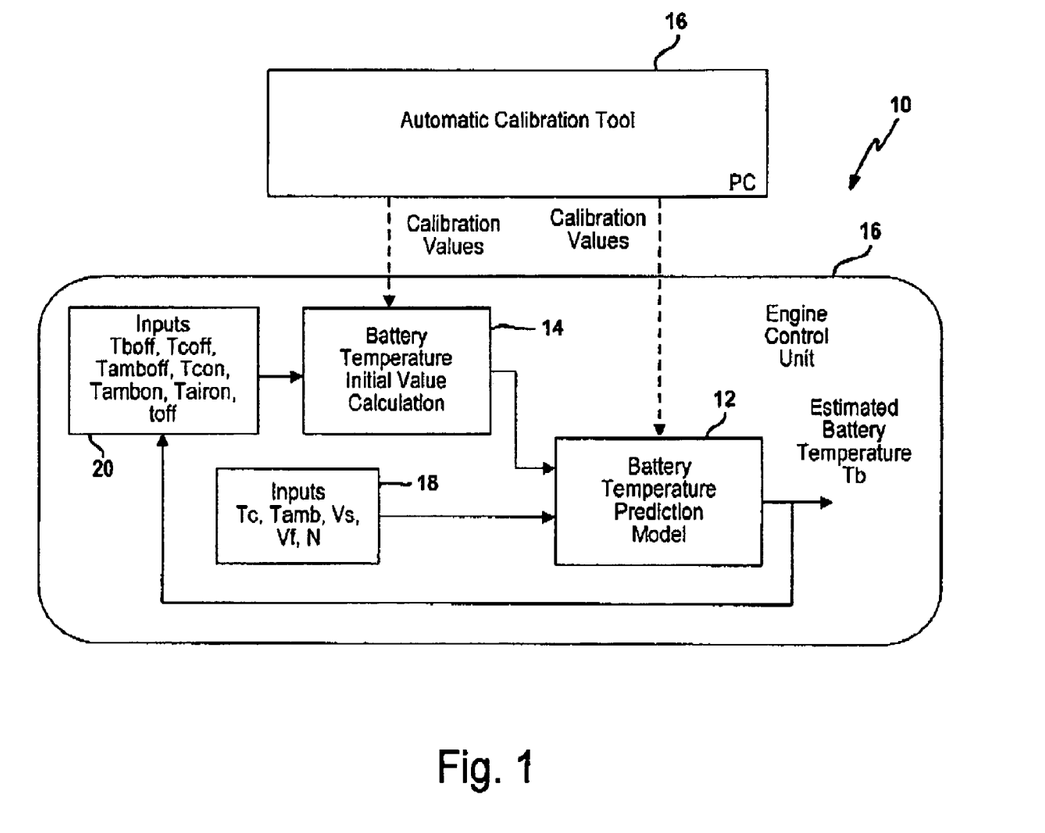
FIG. 1 is a block diagram of a battery temperature virtual sensing system (BTVSS) in accordance with the present invention.

As shown in FIG. 1, a virtual sensing system 10 is provided for estimating internal battery temperature having three major subsystems: (1) a dynamic temperature prediction model 12, (2) an initial value calculation model 14, and (3) an automatic calibration tool 16. The dynamic prediction model 12 and the initial value calculation model 14 can reside in an engine electronic control unit 16, while the automatic calibration tool 16 is arranged to run in a separate PC to generate calibrated system parameters for the models.

(1) Description of Initial Value Calculation:

As disclosed in commonly-owned U.S. Pat. No. 6,902,319 entitled "Vehicular Battery Temperature Estimation," incorporated by reference herein, a battery temperature prediction model 12 is arranged to receive inputs 18 from the following existing engine control system measurements: the coolant temperature $T_c$, the ambient temperature $T_{amb}$, the vehicle speed $V_s$, the engine speed N, and the fan on and off states $V_f$. Model 12 operates when the vehicle engine is running, and as a dynamic system, its current predicted value depends on its previous value. Thus, when model 12 starts to run at engine key-on, an accurate initial value is needed. Otherwise, a significant error in the initial value can cause a significant processing delay as the algorithm converges the estimated value to an actual battery temperature.

Figure 2:
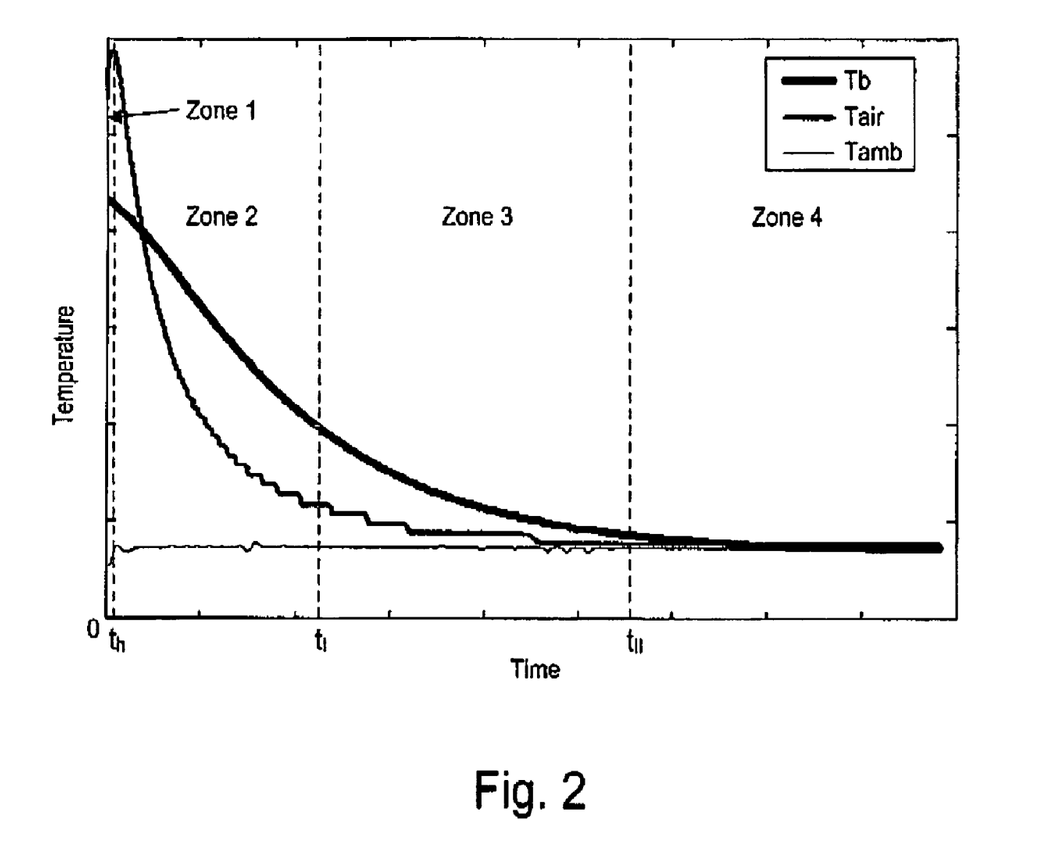
FIG. 2 is a graph showing engine-off time zones used for initial value determination in accordance with one aspect of the present invention.

In order to reduce potential error accumulation, the present invention provides a four-zone initial value estimation arrangement implemented by model 14. This arrangement significantly improves the accuracy of the initial value estimation and minimizes potential continuous accumulation of an error in the estimation of the initial value. More specifically, four time zones Zone 1, Zone 2, Zone 3 and Zone 4 are defined based on the engine-off time between engine key-off and subsequent engine key-on, as shown in FIG. 2. The time parameters $t_h$, $t_I$ and $t_{II}$ are used to determine the boundaries between the respective zones. As shown in FIG. 1, input variables 20 used to estimate the battery initial value $T_{bini}$ in the four-zone method are as follows:

$T_{boff}$—The battery temperature predicted at engine key-off;
$T_{coff}$—The coolant temperature measured at engine key-off;
$T_{amboff}$—The ambient temperature measured at engine key-off;
$T_{con}$—The coolant temperature measured at engine key-on;
$T_{ambon}$—The ambient temperature measured at engine key-on;
$T_{airon}$—The charge air temperature measured at engine key-on; and
$t_{off}$—The engine off time between engine key-off and engine key-on.

Zone 1, defined as the holding zone, is the time when the engine-off time is less than $t_h$. In this zone, the initial value $T_{bini}$ is considered as it is only related to the last predicted value, $T_{boff}$, when the engine is off. That is, $T_{bini}=f_h(T_{boff})$. This is described as a short duration of ignition off cycle. The battery temperature change in this zone is very small due to the thermal mass of the battery. Thus, the engine key-off predicted battery temperature, $T_{boff}$, is used as the initial value of the battery temperature at engine key-on, that is, $T_{bini}=T_{boff}$. The zone threshold $t_h$, in general, can be selected from a range of between a few minutes and half hour depending on the battery temperature characteristics of a vehicle. The benefit of Zone 1 approximation is in avoiding estimation errors caused by frequent operations of engine on and off during a short period of time.

Zone 2 is the time between $t_h$ and $t_I$ and is called the Model Based Estimation Zone. During this period, an initial battery temperature value is estimated using a theoretical engine-off battery temperature model, that is, $T_{bini}=f_m(T_{boff}, T_{coff}, T_{amboff}, T_{con}, T_{ambon}, t_{off})$, which is similar to the model described in commonly-owned U.S. Pat. No. 6,902,319. The engine-off battery temperature model of this embodiment uses the model described at equation (7), column 4 of U.S. Pat. No. 6,902,319, but with $$T_{amb}=\tfrac{1}{2}(T_{amboff}+T_{ambon})$$

substituted for $T_{amboff}$ in that equation. Additionally, the instant model is used only for $t_h < t_{off} \le t_I$, i.e. only during time zone 2, the model-based estimation time zone.

Zone 3 is the time between $t_I$ and $t_{II}$ and is called the Self-Adjustment Zone I. During this period, the temperature of both the battery and vehicle charge air sensors decrease slowly in an approximate linear manner. The linear behavior allows direct estimation of an initial value from the charge air temperature ($T_{airon}$) and the ambient temperature ($T_{ambon}$) when the engine is turned on. In this case, the calculation of the initial battery temperature value is independent of the last predicted battery temperature value ($T_{boff}$), and does not need the engine-off time ($t_{off}$). Thus, an error in the battery temperature estimated at the engine off time will not propagate to the new battery temperature estimated using this method at the engine on time. This self-adjustment feature eliminates error accumulation that can otherwise result from repeated initial estimation using the theoretical model. In an exemplary embodiment, the duration of the time from the engine-off to the time $t_I$ can be several hours long.

In Self-Adjustment Zone I, calculation of the initial value depends on an empirical relationship of the battery temperature to the charge air and ambient temperatures when the engine is turned on, that is, $T_{bini}=f_I(T_{airon}, T_{ambon})$. Mathematically, the function $f_I$ could be a two dimensional polynomial of $T_{airon}$ and $T_{ambon}$, or simply a linear combination of $T_{airon}$ and $T_{ambon}$. The coefficients used in the function $f_I$ and the threshold time $t_I$ and $t_{II}$ are optimally determined using a systematic method as discussed below.

Zone 4 is the time when the engine-off time is greater than $t_{II}$ and is called the Self-Adjustment Zone II. After longer periods of engine off time, the battery temperature and the charge air temperature will approach a value near or equal to ambient temperature. The initial value is thus approximated to be the charge air temperature when the engine is turned on. That is, $T_{bini}=f_{II}(T_{airon})=T_{airon}$. As in the Self-Adjustment Zone I, the initial value is independent of the last predicted value $T_{boff}$ and does not use the measurement of engine-off time. Thus any error in $T_{boff}$ is not introduced into the new estimation of internal battery temperature after the engine is turned on, and any errors accumulated in repeated initial value estimations are avoided as well.

Thus, in accordance with the present invention, an initial value for battery temperature can be determined as follows:

$$T_{bini} = \begin{cases} f_h(T_{boff}) & t \le t_h & \text{(Zone 1)} \\ f_m(T_{boff}, T_{coff}, T_{amboff}, T_{con}, T_{ambon}, t) & t_h < t \le t_I & \text{(Zone 2)} \\ f_I(T_{airon}, T_{ambon}) & t_I < t \le t_{II} & \text{(Zone 3)} \\ f_{II}(T_{airon}) & t > t_{II} & \text{(Zone 4)} \end{cases}$$

(2) Description of Automatic Calibration of the BTVSS:

The virtual vehicular battery temperature sensing system of the present invention provides accurate battery temperature predictions that can outperform arrangements that use physical battery sensors. A set of well calibrated system parameters provides optimum system performance. Thus, obtaining a set of desirable system parameters in a fast, efficient and simple manner facilitates such optimization. There are many vehicle families and each family may have several different engine compartment configurations. Examples of factors affecting calibration include different sizes and thermal capacity of batteries, different sizes and power ratings of engines, different location of the battery within the engine compartment or other engine area of vehicles, and different cooling fans. All these variations require corresponding change of the system parameters. Thus, the in accordance with yet another aspect of the present invention, a systematic, easy to use tool is provided to optimally determine such system parameters.

In accordance with this aspect of the present invention, a graphic user interface (GUI) based calibration tool 16 is provided, i.e., the Virtual Temperature Sensor Comprehensive Tool (VTSCT). VTSCT utilizes a systematic calibration method and procedure to optimally calibrate the parameters of the BTVSS for a given set of criteria.

Figure 3:
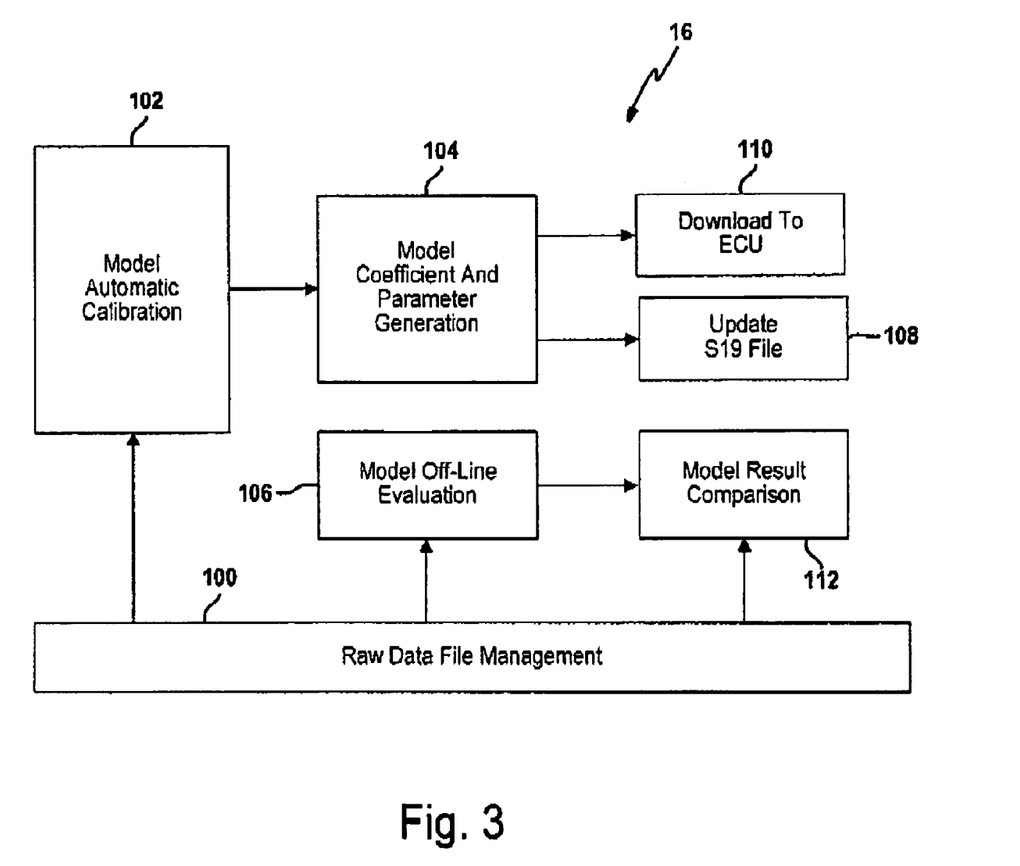
FIG. 3 is a block diagram of showing the main functions of VTSCT.

As illustrated in FIG. 3, VTSCT includes several main functions including: raw data file management 100, automatic model calibration 102, model coefficient and parameter generation 104, model off-line evaluation 106, S19 file updating 108, and ECU downloading 110. The raw data file management 100 is arranged to manage collected vehicle data files and selects signals for model training and evaluation. The automatic model calibration 102 and the model coefficient and parameter generation 104 functions provide an automatic process for training the model. Selected signals are input from managed data files and the model coefficients and other calibration parameters are generated in a format that can be directly used in a vehicle ECU. The model off-line evaluation 106 function allows evaluation of the model performance with the generated coefficients, parameters and various collected vehicle data. The S19 file update 108 function is arranged to write the generated calibrations directly into an S19 file, which can be used to flash a vehicle ECU. The download to ECU 110 feature sends the generated coefficients and parameters into a ECU. In an exemplary embodiment, the VTSCT includes three graphic user interface windows as follows: (1) a VTS Calibration and Evaluation window used with the model automatic calibration, the model coefficient and parameter generation, and the model off-line evaluation; (2) a VTS Project/Test window used with the raw data file management, and (3) a Write Calibrations To a S-record File window used when updating a S19 file with VTSCT generated coefficients.

Thus, the VTSCT tool of the present invention allows for convenient, efficient, and automated model related calibration and evaluation. After the necessary data collection, a user enters the file numbers, setup parameters and running options into GUI windows. tool 16 automatically computes and plots the results at block 12, as well as generates any associated documentation. The VTSCT advantageously reduces or eliminates need for specific user training or understanding of the operation of the BTVSS and its detailed calibration mechanism. Also, errors from mathematical operations are eliminated by automatically computing the calibration values, and variation between different manual calibration operations is eliminated by having the GUI interpret the data while systematically generating the calibration coefficients. These benefits result in a faster process.

Automatic calibration of the BTVSS includes calibration of the battery temperature prediction model 12, also called the Engine-On model, used when the engine is running, and the calibration of the initialization model 14 used at engine key-on.

More specifically, automatic calibration of the initialization model 14 includes:
 (1) the coefficients of the theoretical engine-off battery temperature model in Zone 2;
 (2) the time threshold $t_I$ that starts the self-adjustment I zone and the coefficients used in the calculation of this zone;
 (3) The time threshold $t_{II}$ that starts the self-adjustment II zone.

Figure 4:
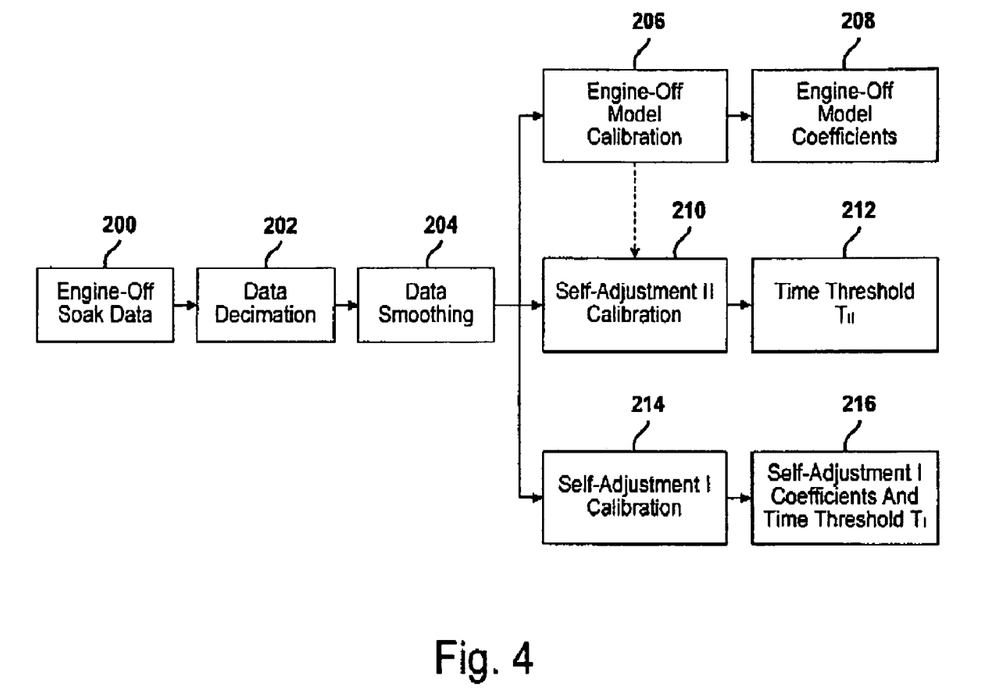
FIG. 4 is a block diagram of the calibration of the initialization model.

FIG. 4 is a block diagram of the calibration for the battery model initial value calculation using an Engine-Off Model.

The model provides an output for predicted internal battery temperature $T_b$. When training the model, measured $T_{bs}$ (engine soak data) data needs to be collected as denoted at block 200 together with the required input signals available in the vehicle ECU. Proper data sampling rate is important when determining the coefficients used in the theoretical engine-off battery temperature model. An under sampling rate can result in signal aliasing issues, and an over sampling rate can affect the training results because the calculation becomes too sensitive to data noise. The automatic calibration tool of the present invention utilizes a data decimation function 202 to prevent over and under data sampling. When the sample rate that is used to collect the training data is too high, it will automatically reduce the data sample rate to a desired level in the training. In addition to proper data sampling rate, signal quality is also important to achieve a high quality of calibration. The automatic calibration tool of the present invention includes a data smoothing function 204 to filter out noise in the data from the ECU or measurements. After the data has been preprocessed as described above, the model input data and the desired model output data are used to search for optimal parameters that achieve the desired model performance.

More specifically, as denoted at block 206, the engine-off model is calibrated by letting $C_m=[c_{off1}, c_{off2}, \ldots, c_{offM}]$ be the vector of the coefficients of the engine-off model, and $X_m(t) = [T_{boff}(t), T_{coff}(t), T_{amboff}(t), T_{con}(t), T_{ambon}(t)]$ the model input vector, then the optimal coefficients of the model (denoted as block 208) that minimizes the total error is:

$$e_m(C_m) = \sum_t q_m(T_{bs}(t) - f_m(X_m(t), C_m))$$

given the criterion defined by the error function $q_m(\cdot)$ from all the data points from engine off time 0 to a time point $t_{end}$. That is, $$\min_{C_m} e_m(C_m).$$

Note that $t_{end}$ is larger than the time threshold $t_I$. The most popular criteria is the square error $q_m(u)=u^2$ or the mean square error $q_m(u)=E(u^2)$, that is, the expectation of the square error.

As denoted by blocks 210 and 212, the second step is to determine the time threshold $t_{II}$ that starts the self-adjustment II zone, i.e., find a $t_{II}$ that minimizes total error:

$$e_{II}(t_{II}) = \sum_{t \geq t_{II}} q_{II}(T_{bs}(t) - f_{II}(T_{airon}(t)))$$

given the criterion defined by the error function $q_{II}(\cdot)$ and the data that the engine off time is larger than $t_{II}$. That is, $$\min_{t_{II}} e_{II}(t_{II}).$$

This is a one-dimensional optimal search and the data size is not the same in each of iterations because the time itself is a value to be searched. This optimization process to find $t_{II}$, $T_b(t)$ and $T_{airon}(t)$ uses real vehicle measured soak data. Typically, a significant amount of time is needed to collect this data because of the large thermal capacity of a vehicle battery. However, because the engine-off model and its coefficients have been obtained from the above-described search, a set of data $\hat{T}_b(t)$ can be generated from the model $f_m(\cdot)$. Similarly, a model for the charge air temperature $T_{air}(t)$ can be developed to generate a set of data $\hat{T}_{airon}(t)$. Then, the data sets are applied to:

$$e_{II}(t_{II}) = \sum_{t \geq t_{II}} q_{II}(\hat{T}_b(t) - f_{II}(\hat{T}_{airon}(t)))$$

to find $t_{II}$. This is especially useful when real-world data is not available.

As denoted by blocks 214 and 216, the third step is to determine the time threshold $t_I$ that starts the Self-Adjustment I Zone and coefficients used in the Self-Adjustment I model. Let $C_I=[c_{I1}, c_{I2}, \ldots, c_{IN}]$ be the vector of the coefficients of the self-adjustment I model, and $X_I(t)=[T_{ambon}(t), T_{ambon}(t)]$ the model input vector, then a $t_I$ and $C_I$ are found together that minimize the total error:

$$e_I(t_I, C_I) = \sum_{t_I < t < t_{II}} q_m(T_{bs}(t) - f_I(X_I(t), C_I))$$

given the criterion defined by the error function $q_I(\cdot)$ with the data points from engine off time $t_I$ to $t_{II}$. That is, min $$\min_{t_I, C_I} e_I(t_I, C_I).$$

Because the optimal time threshold $t_I$ and the coefficients $C_I$ are found together, the process becomes more complicated than the other search process. That is, a complete search of $C_I$ is performed at each search step of the time threshold $t_I$ with a given data size depending on $t_I$.

The three steps illustrate all the optimal coefficient search processes for the models used in the initial value calculation and how they are utilized in the tool. The tool automates all of these operations.

Figure 5:
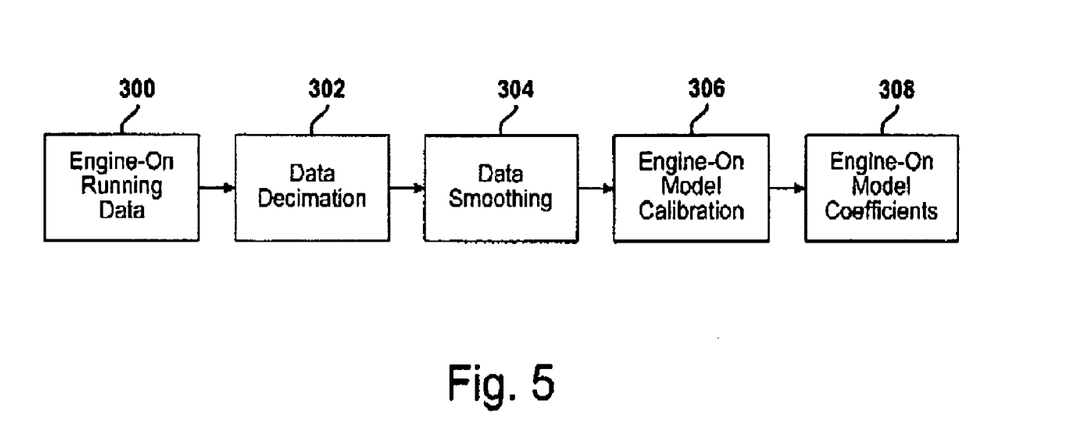
FIG. 5 is a block diagram of the engine-on model calibration.

In addition, using a similar method, all of the coefficients can likewise be found for the dynamic temperature prediction model 12, or the Engine-On Model, by running the tool at all of its sampling times when engine is on as shown in FIG. 5. More specifically, generating the Engine-On Model calibration requires the internal battery temperature data $T_{bon}$ be collected together with other model input signals available in the ECU as denoted at block 300. The data is processed through a data decimation and smoothing process (blocks 302 and 304) prior to determining the optimal coefficients (denoted as blocks 306 and 308). As with the Engine-Off calibration described above in connection with FIG. 4, let $C_d=[c_{d1}, c_{d2}, \ldots, c_{dL}]$ be the vector of the coefficients of the Engine-On Model, and $X_d(t)=[T_c(t), T_{amb}(t), V_s(t), V_f(t), N(t)]$ the model input vector, then the Engine-On Model coefficients $C_d$ that minimize the total error are:

$$e_d(C_d) = \sum_t q_d(T_{bon}(t) - f_d(X_d(t), C_d))$$

given the criterion defined by the error function $q_d(\cdot)$ with all data points. That is, $$\min_{C_d} e_d(C_d).$$

While one or more embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of estimating en initial value for an internal temperature of a vehicle battery using a program controlled engine control unit and a program controlled automatic calibration tool, the method comprising:
   using the engine control unit to determine which of a predetermined set of time zones correlates with a measured period of time for an engine of the vehicle being in an engine-off condition, wherein the time zones are categorized as four different possible time zones comprising a holding time zone, a model based estimation time zone which is greater in time than the holding time zone, a first self-adjustment time zone which is greater in time than the model based estimation time zone, and a second self-adjustment time zone which is greater in time than the first self-adjustment time zone;
   using the automatic calibration tool to generate a set of parameters correlated with the determined time zone; and
   using the engine control unit to determine an initial estimated value of the internal temperature of the battery as a function of the set of parameters.

2. The method of claim 1 wherein in the holding time zone, the initial temperature value is determined as a function of an internal battery temperature predicted at the time the engine is placed in the engine-off condition.

3. The method of claim 2 wherein the initial temperature value is equal to the internal battery temperature predicted at the time the engine is placed in the engine-off condition.

4. The method of claim 1 wherein in the model based estimation time zone, the initial temperature value is determined as a function of: battery temperature predicted at engine-off, coolant temperature measured at engine-off, ambient temperature measured at engine-off, coolant temperature measured at engine-on, and ambient temperature measured at engine-on, and time elapsed between engine-off and engine-on.

5. The method of claim 1 wherein in the first self-adjustment time zone, the initial temperature value is determined as a function of ambient temperature measured at engine-on, and charge air temperature measured at engine-on.

6. The method of claim 5 wherein the function comprises a two-dimensional polynomial in charge air temperature measured at engine-on and ambient temperature measured at engine-on.

7. The method of claim 5 wherein the function comprises a linear combination of charge air temperature measured at engine-on and ambient temperature measured at engine-on.

8. The method of claim 1 wherein in the second self-adjustment time zone, the initial temperature value is determined as a function of charge air temperature measured at engine-on.

9. The method of claim 8 wherein the initial temperature value is equal to the charge air temperature measured at engine-on.

10. The method of claim 1 wherein determining an initial estimated value of the internal temperature of the battery further comprises:
   calibrating coefficients of an engine-off battery temperature model used during the model-based estimation time zone;
   determining a time threshold defining a start of the second self-adjustment time zone using battery temperatures as measured by engine soak data or predicted by a calibrated engine-off battery temperature model; and
   calibrating coefficients of a first self-adjustment time zone model used during the first self-adjustment time zone and a time threshold defining a start of the first self-adjustment time zone.

11. The method of claim 10 wherein the coefficients of the engine-off battery temperature model are calibrated by:
   forming a model input vector and a model coefficient vector;
   selecting a model error function of measured battery temperature and predicted battery temperature; and
   choosing the coefficients which minimize the model error function.

12. The method of claim 10 wherein the time threshold defining the start of the second self-adjustment time zone is determined by:
   selecting an error function of a difference between battery temperature, as measured from engine soak data or predicted by the calibrated engine-off battery temperature model, and battery temperature predicted by a function of charge air temperature measured at engine-on; and
   selecting the time threshold defining the start of the second self-adjustment time zone which minimizes the error function.

13. The method of claim 10 wherein the coefficients of the first self-adjustment time zone model and the time threshold defining a start of the first self-adjustment time zone are determined by:
   forming a model input vector and model coefficient vector;
   selecting a model error function of a difference between battery temperature, based on engine soak data or predicted by the calibrated engine-off model, and battery temperature predicted by a function of ambient temperature measured at engine-on and charge air temperature measured at engine-on; and
   selecting coefficients and the time threshold defining the start of the first self-adjustment time zone which minimize the error function.

* * * * *